United States Patent [19]

Halstead, Jr. et al.

[11] 3,887,725

[45] June 3, 1975

[54] PROCESS FOR IMPROVING LUMEN MAINTENANCE OF CALCIUM HALOPHOSPHATE PHOSPHORS USED IN A FLUORESCENT LAMP

[75] Inventors: Albert O. Halstead, Jr., Waverly; Donald A. Hebbard, Genoa, both of N.Y.

[73] Assignee: GTE Sylvania Incorporated, Stamford, Conn.

[22] Filed: Dec. 4, 1972

[21] Appl. No.: 311,665

[52] U.S. Cl. .......................... 427/67; 252/301.6 P
[51] Int. Cl. ...................... H01j 61/35; H01j 61/42
[58] Field of Search .............. 252/301.4 P, 301.6 P; 117/33.5 L

[56] References Cited
UNITED STATES PATENTS
3,430,089  2/1969  Sarver et al. ............. 252/301.6 P X
FOREIGN PATENTS OR APPLICATIONS
45-7438  3/1970  Japan ............................ 117/33.5 L

*Primary Examiner*—Jack Cooper
*Attorney, Agent, or Firm*—Norman J. O'Malley; William H. McNeill; Donald R. Castle

[57] ABSTRACT

Addition of zinc orthophosphate to a calcium halophosphate-lacquer slurry before application to a fluorescent lamp tube increases the lumen maintenance thereof. The additive quantity is in the range of from 0.06 to 0.60 percent by weight of the halophosphate phosphor.

2 Claims, No Drawings

PROCESS FOR IMPROVING LUMEN MAINTENANCE OF CALCIUM HALOPHOSPHATE PHOSPHORS USED IN A FLUORESCENT LAMP

BACKGROUND OF THE INVENTION

This invention relates to fluorescent lamp phosphors and more particularly to the improvement of lumen maintenance in such phosphors.

Calcium halophosphate phosphors of the general formula $Ca_{10}(F,Cl)_2(PO_4)_6$: Mn,Sb are used extensively in fluorescent lighting. One area of improvement for these phosphors has been in lumen maintenance. It has been suggested that the incorporation of zinc in the lattice of such phosphors could provide for increased lumen maintenance. See, for example, British Pat. No. 1,125,180, Aug. 28, 1968, titled "Improvements in Calcium Halophosphate Phosphors." However, this procedure requires an intrinsic change in the phosphor lattice. It would be an advance in the art if the lumen maintenance of such phosphors could be improved without changing the lattice thereof.

OBJECTS AND SUMMARY OF THE INVENTION

It is therefore an object of this invention to improve the lumen maintenance of calcium halophosphate phosphors.

It is another object of the invention to provide this improvement without changing the lattice of the phosphor crystal.

These objects are accomplished in one aspect of the invention by adding a small amount of a zinc orthophosphate or zinc borate to a calcium halophosphate-lacquer slurry prior to its application to a fluorescent lamp tube. The addition and the slurry are blended until substantially homogeneous and then the mixture is applied in a known manner.

DESCRIPTION OF THE PREFERRED EMBODIMENTS

For a better understanding of the present invention, together with other and further objects, advantages and capabilities thereof, reference is made to the following disclosure and appended claims.

In accordance with the invention a phosphor slurry comprising a calcium halophosphate and a suitable lacquer has added thereto a compound selected from the group consisting of zinc orthophosphate and zinc borate. The additive material comprises about 0.06 to 0.60 weight percent of the phosphor in the slurry. The mixture is blended until substantially homogenous and is then applied to a fluorescent lamp tube and baked according to known techniques. It has been found when such a process is utilized that lumen maintenance is improved with little or no decrease in brightness.

While there have been shown what are at present considered to be the preferred embodiments of the invention, it will be apparent to those skilled in the art that various changes and modifications can be made therein without departing from the scope of the invention as defined by the appended claims.

What is claimed is:

1. In a process of fabricating a fluorescent lamp in which a slurry of a calcium halophosphate phosphor having the general formula $Ca_{10}(F,Cl)_2(PO_4)_6$:Mn,Sb and a suitable lacquer is applied to the interior surface of said lamp and baked, the improvement wherein prior to the application of said slurry to said surface, an amount of zinc orthophosphate sufficient to increase lumen maintenance of said phosphor is added to said slurry and the resultant slurry is blended to form a substantially homogenous mixture.

2. The process of claim 1 wherein said amount of said zinc orthophosphate is between about 0.06 to 0.60 weight percent of said phosphor.

* * * * *